United States Patent [19]
Mihailovski

[11] 3,927,220
[45] Dec. 16, 1975

[54] METHOD OF CONTROLLING PESTS WITH THIOUREIDO SULFONANILIDE COMPOUNDS

[75] Inventor: Alexander Mihailovski, Berkeley, Calif.

[73] Assignee: Stauffer Chemical Company, Westport, Conn.

[22] Filed: June 12, 1974

[21] Appl. No.: 478,489

Related U.S. Application Data

[62] Division of Ser. No. 217,697, Dec. 29, 1971, Pat. No. 3,832,384.

[52] U.S. Cl. ............... 424/321; 424/46; 424/168; 424/357
[51] Int. Cl.² ................................... A01N 9/16
[58] Field of Search .................. 424/300, 321

[56] References Cited
UNITED STATES PATENTS

| | | | |
|---|---|---|---|
| 3,420,882 | 1/1969 | Muth et al. | 424/321 X |
| 3,504,026 | 3/1970 | Aumuller et al. | 424/321 X |
| 3,832,384 | 8/1974 | Mihailovski | 424/321 |

*Primary Examiner*—Sam Rosen
*Assistant Examiner*—Dale R. Ore
*Attorney, Agent, or Firm*—Daniel C. Block

[57] ABSTRACT

New compounds corresponding to the generic formula:

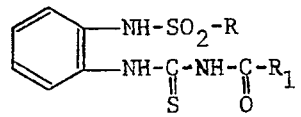

wherein R can be selected from lower alkyl, lower haloalkyl, phenyl, substituted phenyl wherein said substituents can be selected from halogen and lower alkyl; $R_1$ can be selected from lower alkyl, lower alkoxy and lower thioalkyl. The compounds are useful fungicides and biocides.

9 Claims, No Drawings

METHOD OF CONTROLLING PESTS WITH THIOUREIDO SULFONANILIDE COMPOUNDS

This is a division, of application Ser. No. 217,697, filed Dec. 29, 1971 now U.S. Pat. No. 3,832,384.

DESCRIPTION OF THE INVENTION

This invention is directed to a novel group of compounds which may be generally described as thioureido sulfonanilides which are highly active fungicides and biocides. The compounds of the present invention are represented by the generic formula:

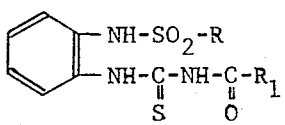

wherein R can be selected from lower alkyl, lower haloalkyl, phenyl, substituted phenyl wherein said substituents can be selected from halogen and lower alkyl; $R_1$ can be selected from lower alkyl, lower alkoxy and lower thioalkyl.

The above compounds can be prepared by treating a 2-aminoalkylsulfonanilide or 2-aminoarylsulfonanilide with an appropriate carbonyl isothiocyanate in an inert solvent such as acetone or the like. The products form rapidly and can be isolated in good purity.

In order to illustrate the merits of the present invention the following examples are provided.

EXAMPLE 1

Preparation of 2-[3′-(Ethoxycarbonyl)-thioureido]-benzenesulfonanilide

To 5.0 g. (0.020 mole) of 2-aminobenzenesulfonanilide dissolved in 30 ml. of acetone were added with stirring 2.6 g. (0.020 mole) ethoxycarbonyl isothiocyanate dissolved in 10 ml. of acetone. This mixture was stirred for 16 hours at room temperature and the precipitated solid was filtered to yield 6.3 g. of 2-[3′-ethoxycarbonyl)-thioureido]-benzenesulfonanilide, m.p. 180°–181°C. (dec.). Yield, 83% of theory.

EXAMPLE 2

Preparation of 2-[3′-(Ethoxycarbonyl)-thioureido]-methanesulfonanilide

To 5.0 g. (0.027 mole) 2-aminomethanesulfonanilide dissolved in 20 ml. of acetone were added 3.5 g. (0.027 mole) ethoxycarbonyl isothiocyanate dissolved in 10 ml. of acetone. A colorless solid precipitated which was filtered to give 7.4 g. of 2-[3′-(ethoxycarbonyl)-thioureido]-methanesulfonanilide, m.p. 168°–169°C. (dec.). Yield, 87% of theory.

Other compounds were prepared in an analogous manner starting with the appropriate starting materials as outlined above. The following is a table of compounds representative of those embodied by the present invention. Compound numbers have been assigned to them and are used for identification throughout the balance of the specification.

TABLE I

| Compound No. | R | $R_1$ |
|---|---|---|
| 1 | –C₆H₄–CH₃ | –OCH₂CH₃ |
| 2 | –CH₃ | –OCH₃ |
| 3 | –CH₃ | –OCH₂CH₃ |
| 4 | –CH₃ | –CH₂CH₃ |
| 5 | –C₆H₅ | –OCH₃ |
| 6 | –C₆H₅ | –OCH₂CH₃ |
| 7 | –C₆H₅ | –CH₂CH₃ |
| 8 | –C₆H₄–Cl | –OCH₃ |
| 9 | –C₆H₄–Cl | –OCH₂CH₃ |
| 10 | –C₆H₄–Cl | –CH₂CH₃ |
| 11 | –CH₂CH₃ | –OCH₃ |
| 12 | –CH₂CH₃ | –OCH₂CH₃ |
| 13 | –CH₂CH₃ | –CH₂CH₃ |
| 14 | –C₆H₄–CH₃ | –OCH₃ |
| 15 | –C₆H₄–CH₃ | –CH₂CH₃ |
| 16 | –CH₃ | –CH₃ |
| 17 | –C₆H₅ | –CH₃ |
| 18 | –C₆H₅ | –OCH₂CH₂CH₃ |
| 19 | –CH₂CH₂CH₃ | –OCH₃ |
| 20 | –CH₂CH₂CH₃ | –OCH₂CH₃ |
| 21 | –CH₂CH₂CH₃ | –OCH₂CH₂CH₃ |
| 22 | –CH₂CH₂CH₃ | –CH₃ |
| 23 | –CH₃ | –OCH₂CH₂CH₃ |
| 24 | –C₆H₄–CH₃ | –OCH₂CH₂CH₃ |
| 25 | –C₆H₄–Cl | –OCH₂CH₂CH₃ |
| 26 | –CH₃ | –OCH₂CCl₃ |
| 27 | –CH₃ | –SCH₂CH₃ |
| 28 | –CH₃ | –O–(–CH₂–)–CH₃ / CH₃ |
| 29 | –CH₃ | –OCH₂CH(CH₃)CH₃ |
| 30 | –C₆H₅ | –OCH₂CCl₃ |
| 31 | –C₆H₅ | –SCH₂CH₃ |
| 32 | –C₆H₅ | –OCH(CH₃) |

TABLE I-continued $$\underset{\substack{\text{NH}-\text{SO}_2-\text{R} \\ \text{NH}-\underset{\underset{S}{\|}}{C}-\text{NH}-\underset{\underset{O}{\|}}{C}-R_1}}{\bigcirc}$$

| Compound No. | R | $R_1$ |
|---|---|---|
| 33 | —⟨phenyl⟩ | —O—(CH$_2$)—CH$_3$ |
| 34 | —⟨phenyl⟩ | —OCH$_2$CH(CH$_3$)$_2$ |
| 35 | —(CH$_2$)—CH$_3$ | —OCH$_2$CH$_2$CH$_3$ |
| 36 | —(CH$_2$)—CH$_3$ | —OCH$_2$CH$_2$CH$_3$ |
| 37 | —CH$_2$Cl | —OCH$_2$CH$_3$ |
| 38 | —CH$_2$CH(CH$_3$)$_2$ | —OCH$_2$CH$_3$ |

FUNGICIDE TESTING PROCEDURES

A. Foliar Preventative Sprays

1. Bean Rust

The chemicals are dissolved in an appropriate solvent and diluted with water containing several drops of Tween 20, a wetting agent. Test concentrations, ranging from 1000 ppm downward, are sprayed to runoff on the primary leaves of pinto beans (*Phaseolus vulgaris* L.). After the leaves are dried, they are inoculated with a water suspension of spores of the bean rust fungus (*Uromyces phaseoli* Arthur) and the plants are placed in an environment of 100% humidity for 24 hours. The plants are then removed from the humidity chamber and held until disease pustules appear on the leaves. Effectiveness is recorded as the lowest concentration, in ppm which will provide 50% reduction in pustule formation as compared to untreated inoculated plants.

2. Bean Powdery Mildew

Test chemicals are prepared and applied in the same manner as for the bean rust test. After the plants are dry, the leaves are dusted with spores of the powdery mildew fungus (*Erysiphe polygoni* De Candolle) and the plants are retained in the greenhouse until the fungal growth appears on the leaf surface. Effectiveness is recorded as the lowest concentration, in ppm, which will provide 50% reduction in pustule formation as compared to untreated inoculated plants.

3. Tomato Early Blight

Test chemicals are prepared and applied in the same manner as the bean rust and powdery mildew tests except that 4-week old tomato (*Lycopersicon esculentum*) plants are utilized as the host plant. When the leaves are dry, they are inoculated with a water suspension of spores of the early blight fungus (*Alternaris solani* Ellis and Martin) and placed in an environment of 100% humidity for 48 hours. The plants are then removed from the humidity chamber and held until disease lesions appear on the leaves. Effectiveness is recorded as the lowest concentration, in ppm, which will provide 50% reduction in number of lesions formed as compared to untreated inoculated plants.

B. Tube Systemic Test

1. Bean Rust

The chemicals are dissolved in an appropriate solvent and diluted with tap water to a series of descending concentrations beginning at 50 ppm. Sixty ml. of each concentration are placed in a test tube. A pinto bean plant is placed in each tube and supported with a piece of cotton so that only the roots and lower stem are in contact with the test solution. Forty-eight hours later the bean leaves are inoculated with a water suspension of spores of the bean rust fungus and placed in an environment with 100% humidity for 24 hours. The plants are then removed from the humidity chamber and maintained in the greenhouse until the disease pustules appear on the leaves. Effectiveness is recorded as the lowest concentration, in ppm, which will provide 50% reduction in pustule formation as compared to untreated, inoculated plants.

2. Bean Powdery Mildew

Test chemicals are prepared and applied in the same manner as for the bean rust systemic test. After two days the leaves are dusted with spores of the powdery mildew fungus and maintained in the greenhouse until mycelial growth appears on the leaf surfaces. Effectiveness is recorded as the lowest concentration, in ppm, which will provide a 50% reduction in mycelial growth on the leaf surface as compared to untreated, inoculated plants.

C. Systemic Soil Drench

1. Bean Rust

Pinto beans are grown in 1-pint ice cream cartons, each containing 1 lb. of soil. Aliquots of the toxicant, dissolved in an appropriate solvent, are diluted with 25 ml. of water and drenched onto the soil surface. Two days later the bean leaves are inoculated with a water suspension of spores of the rust fungus, and the plants are placed in an environment with 100% humidity for 24 hours. The plants are then removed from the humidity chamber and maintained in the greenhouse until the pustules appear on the leaves. Effectiveness is recorded as the minimum concentration, in ppm per lb. of soil, which will provide 50% reduction in number of pustules as compared to untreated inoculated plants.

2. Bean Powdery Mildew

The bean plants and chemicals are prepared and applied as in the rust systemic soil drench test. After ten days, the bean leaves are dusted with spores of the powdery mildew fungus and maintained in the greenhouse until the mycelial growth appears on the leaf surface. Effectiveness is recorded as the minimum concentration, in ppm per lb. of soil, which will provide 50% reduction in mycelial growth on the leaf surface in comparison to untreated, inoculated plants.

TABLE II

| Compound No. | Foliar Spray Rust | Foliar Spray Mildew | Foliar Spray Tomato Blight | Tube Systemic Rust | Tube Systemic Mildew | Soil Drench Rust | Soil Drench Mildew |
|---|---|---|---|---|---|---|---|
| 1 | >1000 | 50 | >1000 | — | 1 | — | 6 |
| 2 | 1000 | 50 | >1000 | 1 | 0.13 | 55 | 6 |
| 3 | 1000 | 100 | — | 5 | 0.25 | >55 | 6 |
| 4 | >1000 | 1000 | — | — | 1 | — | >55 |
| 5 | 1000 | 100 | >1000 | — | 1 | — | >55 |
| 6 | 1000 | 100 | — | — | 5 | — | >55 |

TABLE II-continued

| Compound No. | Foliar Spray Rust | Foliar Spray Mildew | Foliar Spray Tomato Blight | Tube Systemic Rust | Tube Systemic Mildew | Soil Drench Rust | Soil Drench Mildew |
|---|---|---|---|---|---|---|---|
| 7 | >1000 | 1000 | — | — | — | — | — |
| 8 | >1000 | 100 | >1000 | — | 5 | — | >55 |
| 9 | 1000 | 50 | >1000 | — | 5 | — | >55 |
| 10 | >1000 | >1000 | — | — | — | — | — |
| 11 | 1000 | 100 | — | 5 | 0.13 | >55 | 13 |
| 12 | >1000 | 500 | — | — | 1 | — | 55 |
| 13 | >1000 | 1000 | — | — | — | — | — |
| 14 | >1000 | 500 | — | — | 5 | — | >55 |
| 15 | >1000 | >1000 | — | — | — | — | — |
| 16 | >1000 | 500 | — | — | 10 | — | — |
| 17 | >1000 | >1000 | — | — | — | — | — |
| 18 | 1000 | 500 | — | — | — | — | — |
| 19 | >1000 | 500 | — | — | 1 | — | >55 |
| 20 | >1000 | 1000 | — | — | 5 | — | >55 |
| 21 | >1000 | 1000 | — | — | — | — | — |
| 22 | >1000 | 1000 | — | — | — | — | — |
| 23 | >1000 | 500 | — | — | 5 | — | — |
| 24 | >1000 | 1000 | — | — | — | — | — |
| 25 | >1000 | 100 | — | — | >50 | — | — |
| 26 | >1000 | 1000 | — | — | — | — | — |
| 27 | >1000 | >1000 | — | — | — | — | — |
| 28 | >1000 | >1000 | — | — | — | — | — |
| 29 | >1000 | >1000 | — | — | — | — | — |
| 30 | >1000 | >1000 | — | — | — | — | — |
| 31 | >1000 | >1000 | — | — | — | — | — |
| 32 | >1000 | 500 | — | — | — | — | — |
| 33 | >1000 | >1000 | — | — | — | — | — |
| 34 | >1000 | >1000 | — | — | — | — | — |
| 35 | >1000 | 500 | — | — | — | — | — |
| 36 | >1000 | 1000 | — | — | — | — | — |
| 37 | | 25 | | | | | |
| 38 | >1000 | 50 | — | — | — | | |

BIOCIDE TESTING PROCEDURES

Tubes of sterilized nutrient and malt extract broth are prepared. Aliquots of the toxicant, dissolved in an appropriate solvent, are injected through the stopper, into the broth, to provide concentrations ranging from 50 ppm downward. The test organisms consist of two fungi, Aspergillus niger (A. n.) van Tieghem and Penicillium italicum (P.i.) Wehmer, and two bacteria, Escherichia coli (E.c.) Migula and Staphylococcus aureus (S.a.) Rosenbach. Three drops of a spore suspension of each of the fungi are injected into the tubes of malt broth and three drops of the bacteria are injected into the nutrient broth. One week later the growth of each organism is observed and effectiveness of the chemical is recorded as the lowest concentration in ppm which provides 50% inhibition of growth as compared to untreated inoculated tubes. The results of these tests are tabulated in Table III.

TABLE III

| Compound No. | A.n. | P.i. | E.c. | S.a. |
|---|---|---|---|---|
| 1 | (50) | (.5) | >50 | 50 |
| 2 | >50 | (1) | >50 | 50 |
| 3 | >50 | (1) | >50 | (50) |
| 4 | >50 | (25) | >50 | (50) |
| 5 | >50 | (5) | >50 | >50 |
| 6 | >50 | (1) | >50 | 50 |
| 7 | >50 | >50 | >50 | >50 |
| 8 | >50 | (50) | >50 | >50 |
| 9 | >50 | (50) | >50 | >50 |
| 10 | >50 | >50 | >50 | >50 |
| 11 | >50 | (25) | >50 | >50 |
| 12 | >50 | (25) | >50 | >50 |
| 13 | >50 | >50 | >50 | >50 |
| 14 | >50 | 25 | >50 | >50 |
| 15 | >50 | >50 | >50 | >50 |
| 16 | >50 | >50 | >50 | >50 |
| 17 | >50 | >50 | >50 | >50 |
| 18 | >50 | >50 | >50 | >50 |
| 19 | >50 | >50 | >50 | 50 |
| 20 | >50 | >50 | >50 | >50 |
| 21 | >50 | >50 | >50 | >50 |
| 22 | >50 | >50 | >50 | >50 |
| 23 | >50 | 5 | >50 | >50 |
| 24 | >50 | >50 | >50 | >50 |
| 25 | >50 | >50 | >50 | >50 |
| 26 | >50 | >50 | >50 | 25 |
| 27 | >50 | 50 | >50 | 50 |
| 28 | >50 | 10 | >50 | >50 |
| 29 | >50 | 50 | >50 | >50 |
| 30 | >50 | >50 | >50 | 1 |
| 31 | >50 | >50 | >50 | 25 |
| 32 | >50 | >50 | >50 | >50 |
| 33 | >50 | >50 | >50 | >50 |
| 34 | >50 | >50 | >50 | >50 |
| 35 | >50 | >50 | >50 | 50 |
| 36 | >50 | >50 | >50 | 25 |
| 37 | 25 | | >50 | >50 |
| 38 | >50 | 50 | >50 | 25 |

( ) = partial control

The compounds of this invention are generally embodied into a form suitable for convenient application. For example, the compounds can be embodied into pesticidal composition which are provided in the form of emulsions, suspensions, solutions, dusts and aerosol sprays. In general, such compositions will contain, in addition to the active compound, the adjuvants which are found normally in pesticide preparations. In these compositions, the active compounds of this invention can be employed as the sole pesticide component or they can be used in admixture with other compounds having similar utility. The pesticide compositions of this invention can contain, as adjuvants, organic solvents, such as sesame oil, xylene range solvents, heavy petroleum, etc.; water; emulsifying agents; surface active agents; talc; pyrophyllite; diatomite; gypsum; clays; propellants, such as dichlorodifluoromethane, etc. If desired, however, the active compounds can be applied directly to feedstuffs, seeds, etc. upon which the pests feed. When applied in such a manner, it will be advantageous to use a compound which is not volatile. In connection with the activity of the presently disclosed pesticidal compounds, it should be fully understood that it is not necessary that they be active as such. The purposes of this invention will be fully served if the compound is rendered active by external influences, such as light or by some physiological action which occurs when the compound is ingested into the body of the pest.

The precise manner in which the pesticidal compositions of this invention are used in any particular instance will be readily apparent to a person skilled in the art. Generally, the active pesticide compound will be embodied in the form of a liquid composition; for example, an emulsion, suspension, or aerosol spray. While the concentration of the active pesticide in the present compositions can vary within rather wide limits, ordinarily the pesticide compound will comprise not more than about 15.0% by weight of the composition. Preferably, however, the pesticide compositions of this invention will be in the form of solutions or suspensions containing about 0.1 to 1.0% by weight of the active pesticide compound.

What is claimed is:

1. A method of controlling pests selected from the group consisting of fungi and bacteria consisting of adding to the habitat thereof a fungicidally and bactericidally effective amount of a compound having the generic formula:

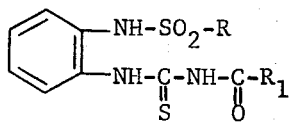

wherein R can be selected from lower alkyl, phenyl, substituted phenyl wherein said substituents can be selected from halogen and lower alkyl; $R_1$ is lower alkyl.

2. A method as set forth in claim 1 wherein R is —$CH_3$ and $R_1$ is —$CH_2CH_3$.

3. A method as set forth in claim 1 wherein R is

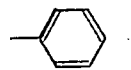

and $R_1$ is —$CH_2CH_3$.

4. A method as set forth in claim 1 wherein R is

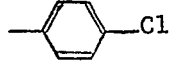

and $R_1$ is —$CH_2CH_3$.

5. A method as set forth in claim 1 wherein R is —$CH_2CH_3$ and $R_1$ is —$CH_2CH_3$.

6. A method as set forth in claim 1 wherein R is

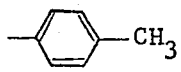

and $R_1$ is —$CH_2CH_3$.

7. A method as set forth in claim 1 wherein R is —$CH_3$ and $R_1$ is —$CH_3$.

8. A method as set forth in claim 1 wherein R is

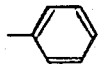

and $R_1$ is —$CH_3$.

9. A method as set forth in claim 1 wherein R is —$CH_2CH_2CH_3$ and $R_1$ is —$CH_3$.

* * * * *